US005275730A

United States Patent [19]

Keuschnigg

[11] Patent Number: 5,275,730

[45] Date of Patent: Jan. 4, 1994

[54] DIP PIPE FOR FACILITIES FOR THE SEPARATION OF SUBSTANCE MIXTURES

[76] Inventor: Josef Keuschnigg, Lormanberg 67, A-8324 Kirchberg (Steiermark), Austria

[21] Appl. No.: 838,798

[22] PCT Filed: Dec. 11, 1991

[86] PCT No.: PCT/AT91/00127

§ 371 Date: Mar. 18, 1992

§ 102(e) Date: Mar. 18, 1992

[87] PCT Pub. No.: WO92/10300

PCT Pub. Date: Jun. 25, 1992

[30] Foreign Application Priority Data

Dec. 13, 1990 [AT] Austria .................................. 2529/90

[51] Int. Cl.[5] .................................................. B65G 53/60

[52] U.S. Cl. ................................ 210/512.1; 55/459.1; 55/462; 138/39; 138/42; 138/44; 210/787; 96/208

[58] Field of Search ............................ 210/787, 512.1; 209/144, 211; 55/459.1, 462, 184, 185, 186, 188, 523; 138/37, 39, 42, 44

[56] References Cited

U.S. PATENT DOCUMENTS 3,841,568 10/1974 Broad .................................. 138/34
4,769,050 9/1988 Shaw et al. .......................... 55/187
5,180,257 1/1993 Narishima et al. ................... 138/37
5,181,943 1/1993 Weber ................................. 55/523

FOREIGN PATENT DOCUMENTS 130364 1/1903 Austria .
0398864 11/1990 European Pat. Off. .
8807791 1/1989 Fed. Rep. of Germany .
245636 1/1926 United Kingdom .
727215 3/1955 United Kingdom .

*Primary Examiner*—Robert A. Dawson
*Assistant Examiner*—David Reifsnyder

[57] ABSTRACT

A baffle means (2) is provided at a dip pipe (1) which latter projects into the separating chamber of a facility for the separation of substance mixtures of a liquid or gaseous medium and a liquid or solid substance under the effect of centrifugal forces, the medium being discharged from the facility through this dip pipe. The baffle means (2) includes at least one baffle (3) having the shape of the shell of a truncated cone, the axis of curvature (4) of which extends in parallel to the longitudinal axis (5) of the dip pipe (1) and is offset with respect to this axis (5). By the baffle means (2), the medium is guided into the dip pipe (1) with simultaneous reconversion of the flow energy into pressure energy, there being imparted to the medium an acceleration oriented axially in the flow-off direction of the medium and an acceleration.

18 Claims, 6 Drawing Sheets

DIP PIPE FOR FACILITIES FOR THE SEPARATION OF SUBSTANCE MIXTURES

BACKGROUND OF THE INVENTION

The invention relates to a dip pipe for apparatuses for the separation of mixtures made up of one liquid or gaseous medium and one liquid or gaseous substance having a higher specific gravity than the medium under the action of centrifugal forces, the medium freed at least partially from the substance being removed from the apparatus through this pipe, with a baffle means at one end of the dip pipe, wherein the baffle means consists of at least one curved baffle and wherein the distance of the baffle from the longitudinal axis of the dip pipe becomes increasingly smaller in the peripheral direction. Facilities for the separation of mixtures of at least one substance and one medium have been known, for example, from EP-A-398,864.

In these known devices, dip pipes are provided for the discharge of the medium freed at least in part, preferably entirely, from the substance or substances to be separated; these dip pipes project into the separating chamber.

It is also known from EP-A-398,864 to arrange baffle devices, in the form of baffle plates, between the dip pipes, these baffle devices extending in the direction of flow from the inside toward the outside in order to effect reversal of the flow direction of the medium when passing from the chamber wherein the substance mixture is set into rotation into the chamber where the actual separation takes place.

Furthermore, baffle means at dip pipes are known in the prior art (for example, Austrian Patent 13,036, British Patent 245,636), which comprise baffle plates; however, the latter are curved about the dip pipe vertical axis. This results in an exclusively radial acceleration which, however, does not contribute anything toward transfer of the medium into the dip pipe.

Further, propeller-like baffle devices are known in the state of the art having several vanes at the inlet end of the dip pipe wherein the individual vanes are oriented so that they reduce or entirely eliminate the rotary movement of the medium entering into the dip pipe. These arrangements, however, have not become popular in practice on account of problems encountered in flow dynamics. The reason for this unpopularity is that the actual flow directions in the region of the dip pipe orifice are unknown.

SUMMARY OF THE INVENTION

The invention is based on the object of further developing the conventional dip pipes in such a way that transfer of the medium is improved from the separating chamber into the dip pipe, or dip pipes, in case two pipes are disposed in a mutually coaxial position and discharge medium into opposite directions. In particular, the embodiment of the dip pipes according to this invention is to be suitable for separating devices in accordance with EP-A-398,864.

According to this invention, this object has been attained in a dip pipe of the type discussed hereinabove by providing that the radii of the baffle lying in planes normal to the axis increase in the axial direction from the free rim of the baffle in opposition to the dip pipe toward the orifice of the dip pipe.

Owing to the fact that the medium, set into rotation, has imparted to it, due to the baffle means of this invention, in the region of the dip pipe orifice not only a radial acceleration but also an axial acceleration, i.e. an acceleration in the discharge direction of the medium through the dip pipe, passage of the medium from the separating chamber into the dip pipe, or the dip pipes in case two dip pipes are provided, takes place in a favorable way from the viewpoint of flow dynamics, and with low loss of energy.

Passage into the dip pipe or dip pipes is improved on account of the feature that the baffle imparts to the medium, in the space lying outside of the dip pipe orifice and within the jacket surface of the dip pipe, simultaneously an acceleration that is oriented radially inwardly and an axial acceleration.

Since the baffle in the invention consists of at least one curved baffle inclined at an acute angle with respect to the axis of the dip pipe, the medium, due to the desire of the latter to rotate with a constant radius of rotation, is forced on account of the special configuration of the baffles according to this invention to enter into the dip pipe, and the thrust (acceleration) imparted to the outflowing medium by the baffle means at the dip pipe is enhanced.

One embodiment of the dip pipe of this invention is characterized in that the baffle exhibits at least one baffle that is curved in a partially conical shape, especially a partially frustoconical shape, wherein the axis of curvature of this baffle is preferably in parallel to the axis of the dip pipe and is offset with respect to this axis, and the maximum radius of curvature of this baffle is larger than the radius of the dip pipe and the minimum radius of curvature thereof is smaller than the radius of the dip pipe.

In a practical realization of this embodiment, the provision can be made according to the invention that the baffle has the shape of a truncated cone shell or, in case of several baffles, of a partially truncated cone shell, the rim of this shell lying at the end with the larger radius adjoining the dip pipe. This embodiment has the advantage that the baffle can be projected into a plane.

A structurally simple embodiment of the dip pipe with its baffle means results if, according to a further suggestion of the invention, the provision is made that the rim of the baffle is connected to the rim of the dip pipe.

The advantageous effect on the flow of the medium out of the separating chamber into the dip pipe or dip pipes, respectively, under the action of the baffle which, so to speak, pares layers from the rotating medium and conducts them into the dip pipe or dip pipes, can be still further improved by making the provision, according to this invention, that two or more identical baffles, the axes of curvature of which with respect to each other and to the axis of the dip pipe extend preferably in parallel, are provided.

The dip pipe according to the invention can furthermore be distinguished in that the baffle comprises at least one baffle extending around the axis by about 360°, or, respectively, that, in case of a baffle means with more than one beffle, each baffle extends around the axis approximately by a fraction of about 360° corresponding to the number of baffles.

In all embodiments—it is also possible to arrange more than two identical baffles—it is advantageous within the scope of the invention to dispose the baffles symmetrically to one another with respect to the axis of the dip pipe.

In all embodiments having more than one baffle, the provision can be made according to the invention that the axes of curvature of the baffles exhibit equal-sized spacings from the axis of the dip pipe and are arranged in mutual opposition with respect to the axis of the dip pipe in diametrical or, respectively, staggered arrangement. In this embodiment, a spatially favorable arrangement is achieved, along with an especially advantageous effect of the baffle means, if the rims of the baffles extending approximately in the direction of the dip pipe axis are fashioned preferably to be straight, and, in case of two baffles, lie in a plane also occupied by the axes of curvature of the baffles and the axis of the dip pipe or, alternatively, in the case of more than two baffles, lie in a cylinder shell concentric to the dip pipe axis.

Further, the provision can be made within the scope of this invention that the openings, defined by the essentially axially-parallel oriented rims of the baffles or by the edge of the dip pipe, are open in the direction of rotation of the medium. Alternatively, the provision can also be made that the openings, defined by the essentially axially-parallel oriented rims of the baffles or by the edge of the dip pipe, are open in opposition to the direction of rotation of the medium.

As mentioned above, the invention can be utilized with special advantage, however not exclusively, in devices as known from EP-A-398,864.

Therefore, the invention also extends to an apparatus for the separation of at least one substance from a liquid or gaseous medium by centrifugal forces, this substance having a specific gravity or a mass different from the medium, especially for the separation of substances having a higher specific gravity from a liquid or gaseous stream, comprising a housing, with devices for the production of a rotary movement of the mixture of substance and medium in a ring-or spiral-shaped space, and with a separating chamber wherein outlet openings are arranged for the medium, freed at least in part from the substance, and for the separated substance, wherein the outlet opening for the purified medium is constituted by at least one dip pipe projecting into the separating chamber. The apparatus is distinguished, according to this invention, in that the dip pipe is fashioned to accomplish the above-mentioned advantages.

BRIEF DESCRIPTION OF THE DRAWINGS

Additional advantages and features of the invention can be seen from the following description of the embodiment illustrated in the drawings wherein.

DETAILED DESCRIPTION OF THE PREFERRED EMBODIMENTS

Figure 1:
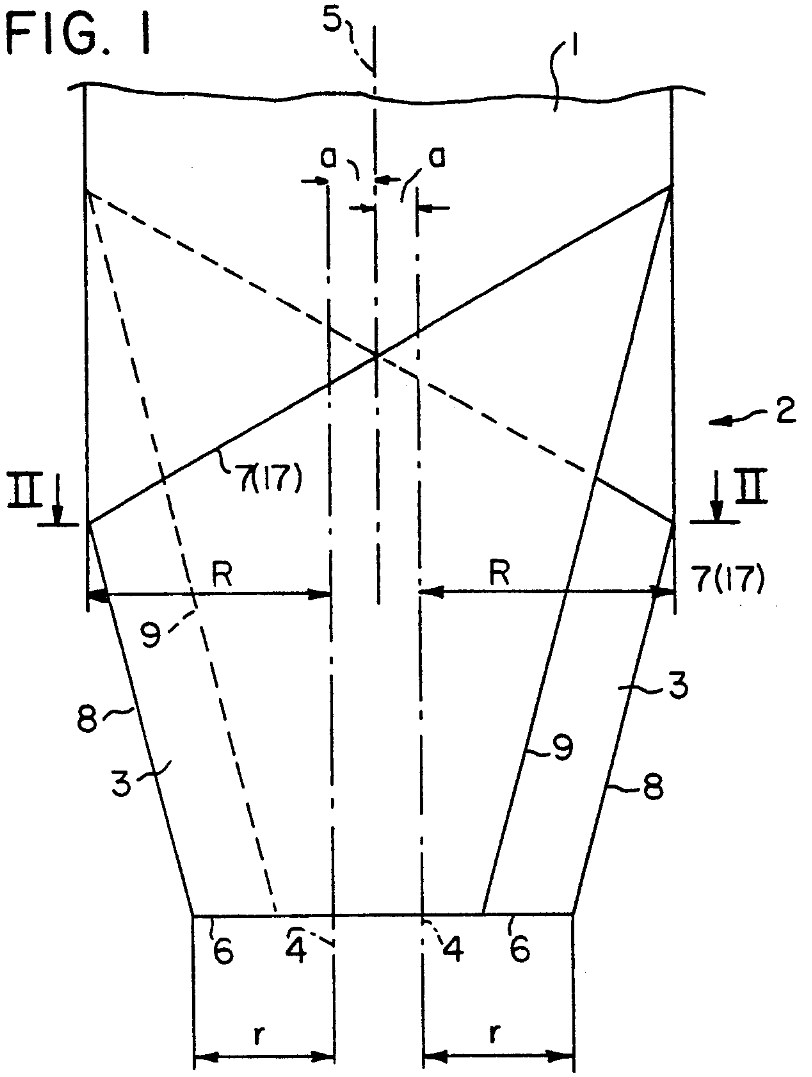
FIG. 1 shows, in plan view, the end of a dip pipe with a baffle means, arranged in a separating chamber.

A dip pipe 1, arranged in a separating chamber of a separating facility, not shown in detail, which latter can, by way of example but preferably, be one of the structures known from EP-A-398,864, carries at its end a baffle means 2 of preferably one to three baffles 3 of identical design. The baffles 3 in the illustrated embodiment are curved in the manner of a frustoconical shell, their axes of curvature 4 being oriented in parallel to the axis 5 of the dip pipe 1.

Figure 2:
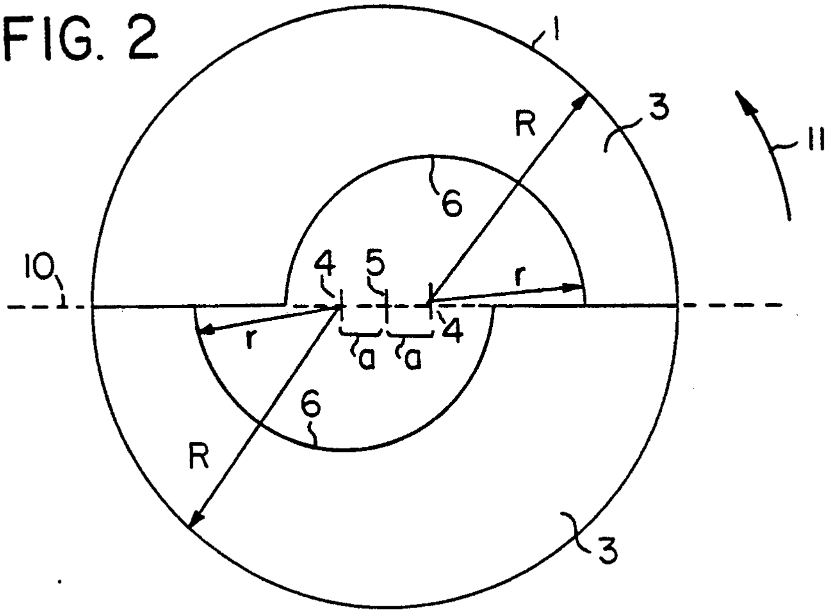
FIG. 2 is a section along line II—II in FIG. 1.

As shown in FIGS. 1 and 2, the axes of curvature 4 of the baffles 3 are located at a distance from the longitudinal axis 5 of the dip pipe 1. The arrangement here is such that both axes of curvature 4 of the baffles 3 have the same distance a from the axis 5 of the dip pipe 1.

The baffles 3 have the radius of curvature r at their free rims 6 and are connected at their end with the larger radius of curvature R to the rim 17 of the end of the dip pipe 1 projecting into the separating chamber. In the transitional zone between the dip pipe 1 and the two baffles 3, an edge 7 results therefrom which is curved toward two directions and is of a semicircular shape in the top view (in correspondence with the sectional view of FIG. 2); this edge 7 is formed by the rims of the baffles 3 and the rim 17 of the dip pipe 1. This edge 7 indicates approximately the flow path of the medium in the region of the two baffles 3 before entering the dip pipe 1.

It can also be seen from the sectional view of FIG. 2 that the linear rims 8 and 9 of each baffle 3, extending approximately in the direction of the axes of curvature 4, lie in the plane 10 also occupied by the two axes of curvature 4 of the baffles 3 and by the axis 5 of the dip pipe 1.

The aforedescribed arrangement and design of the two baffles 3 has the result that the latter increasingly approach the axis 5 of the dip pipe 1 in the direction of rotation of the medium (see arrow 11 in FIG. 2), and that the generatrices of the partial frustoconical shell of the baffles 3 are inclined at an acute angle with respect to the axis 5 of the dip pipe 1.

Figure 3:
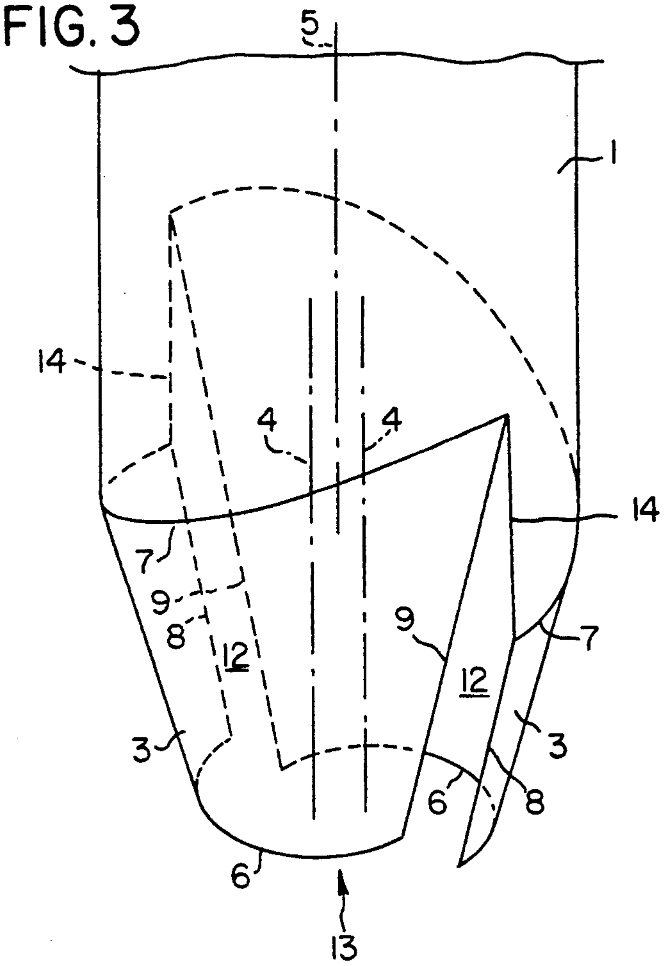
FIG. 3 shows the dip pipe illustrated in FIGS. 1 and 2, with baffle means, in an oblique view.

By the above-described structure of the two baffles 3, as seen in FIG. 3, two inlet slots 12 are provided in addition to the orifice 13 that is open parallel to the axis 5; these slots 12 are in each case defined by neighboring rims 8 and 9 of the two baffles 3 and by the edge 14—this edge 14 extending in parallel to the axis 5 of the dip pipe 1—at the end of the dip pipe 1. The slots 12 pass over into the orifice 13 at the free end of the baffles 3.

Figure 4:
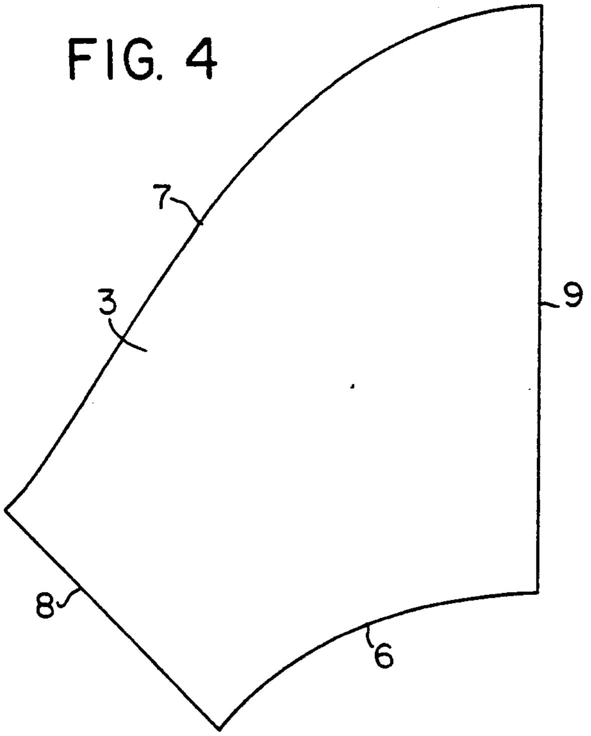
FIG. 4 shows a blank for the baffles of the baffle means.

FIG. 4 shows one of the baffles 3 in the projected, planar condition, i.e. its cut-to-size blank.

Figure 5:
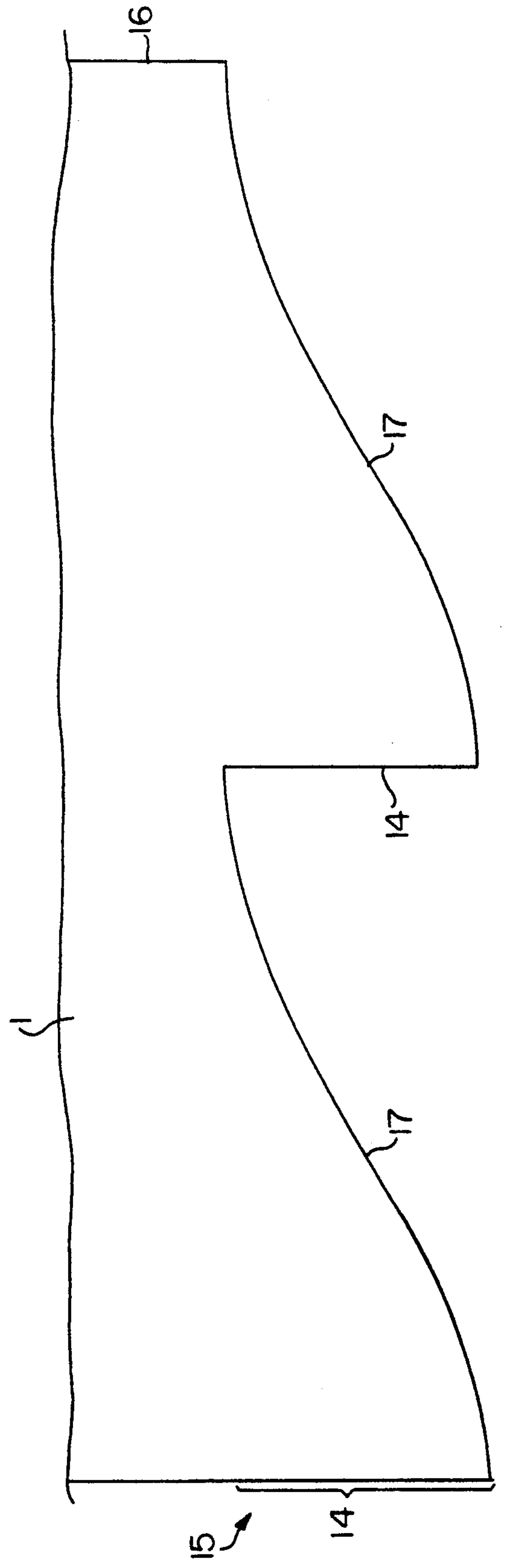
FIG. 5 shows a projection into a plane of the end of a dip pipe provided with the baffle means and arranged in the separating chamber.

FIG. 5 shows a projection of the end of the dip pipe 1 at which the baffle means 2 made up of the two baffles 3 is arranged and connected to the rim edge 17. In this connection, it is to be noted that a portion of the edge 15 forms the edge 14 defining the slot 12. The remaining portion of the edge 15 adjoins the edge 16 lying at the other end of the projection, when the dip pipe 1 is closed.

In the described embodiment of the baffle means 2 with two baffles 3 according to this invention, each baffle 3 acts on the medium over half a revolution of the medium and/or over half the circumference of the separating chamber. In case more than two baffles 3 are provided, each one of them acts on the medium over the fraction (e.g. one-third, one-fourth, etc.) of the revolution of the medium corresponding to the number of baffles.

Figure 6:
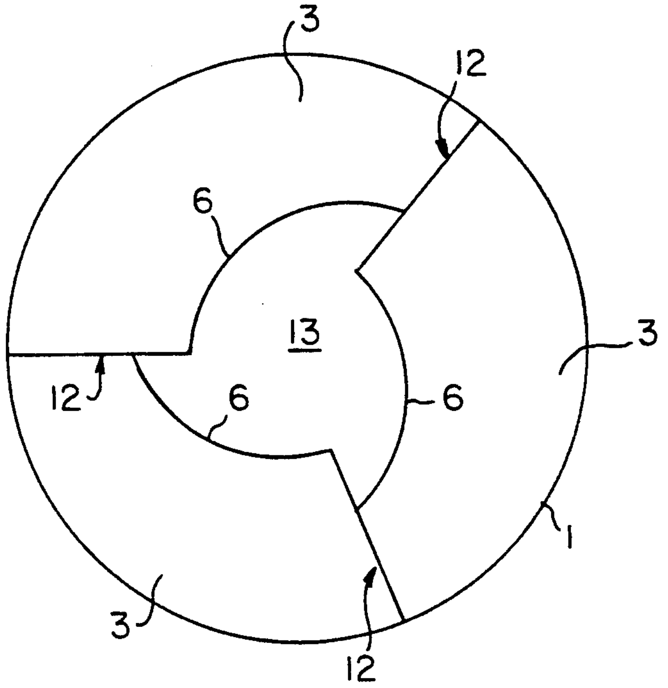
FIG. 6 shows an embodiment with three baffles.

The baffle means 2 of this invention, with its normally two but, in certain constructions, also three (compare FIG. 6) or four baffles 3, can also be considered to be a "helical diffuser".

Another difference between the baffle means 2 according to this invention and the baffle devices of the state of the art resides in that the latter are defined, on the one hand, in the plane by the end of the dip pipe, or act in a cylindrical surface defined by the jacket surface of the dip pipe. In contrast thereto, the baffle means 2 according to this invention acts in the space between the two aforementioned surfaces (plane of orifice 18 and imagined extension of the jacket surface of the dip pipe).

On account of the design of the baffle means 2 on the orifice-side end of the dip pipe 1 in accordance with this invention, the peripheral velocity or, respectively, the rotary movement of the medium is converted into an axial movement immediately upon entrance into the region of the baffles 3. As a result, supported by the configuration of the baffle means 2 according to this invention, the occurrence of exclusively radial movements of the medium in the zone of the baffle 3 is likewise prevented. Rather, an axial flow-off movement of the medium takes place at the same time. This flow-off prevents a pure rotational movement of the medium from happening in the region of the orifice-side end of the dip pipe.

It is not an absolute necessity for the axes 4 of the baffles 3 to be oriented in parallel to the axis 5 of the dip pipe 1.

The above-described effects are likewise achieved by the possible use of baffles 3 having the shape of the partial shell of an oblique cone, with a cone axis that is not parallel to the axis 5 of the dip pipe. By the oblique cone with an inclined axis, a very steep bias line (edge 7) is also obtained between the baffle or baffles 3 and the jacket of the dip pipe 1. In this regard, see FIG. 3 again.

In principle, baffles 3 are also possible having the shape of a partial shell of an oblique cone with an axis in parallel to the axis 5 of the dip pipe 1.

Figure 7:
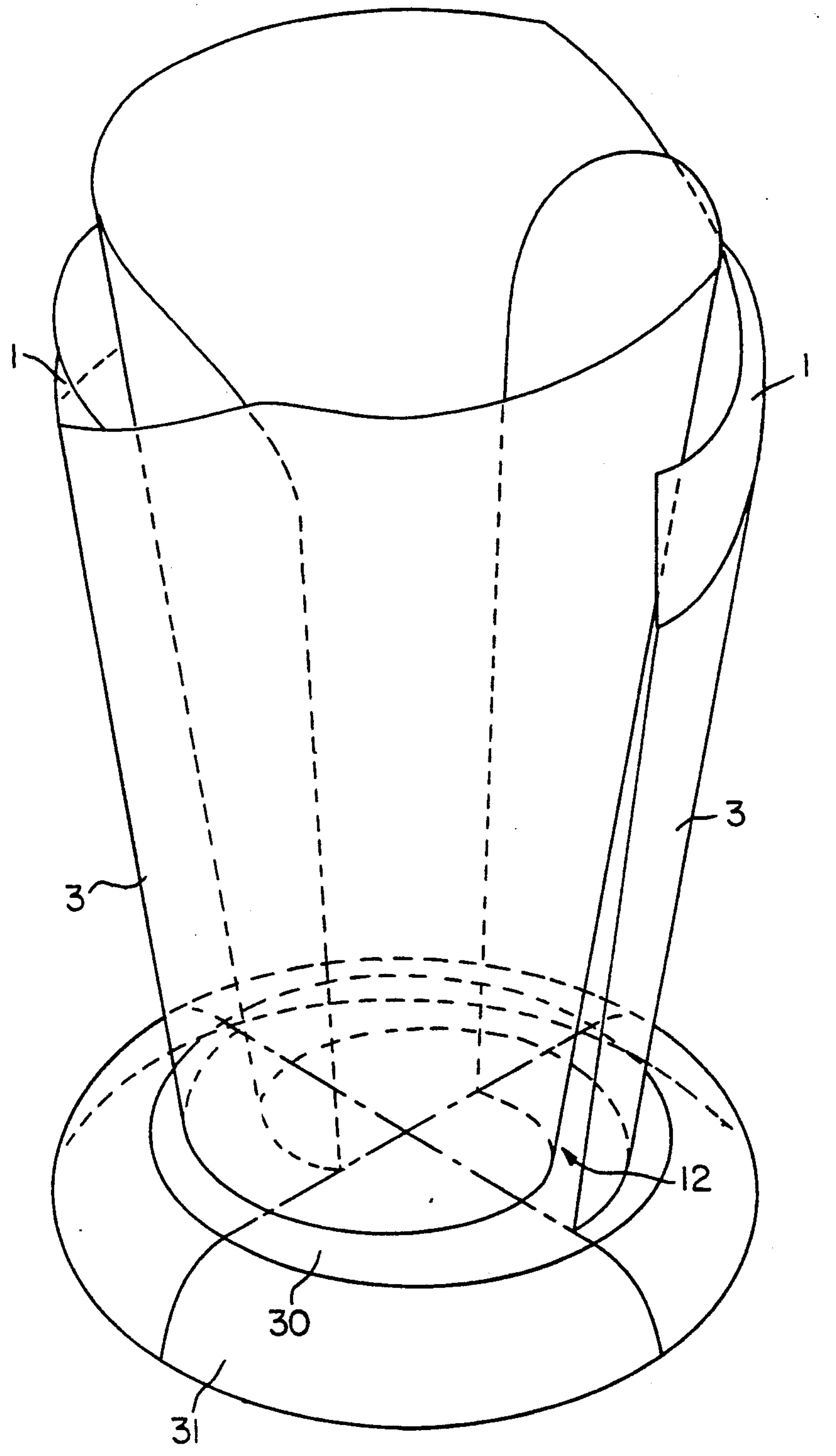
FIG. 7 shows a modified embodiment of the baffle means in a diagrammatic view.
Figure 8:
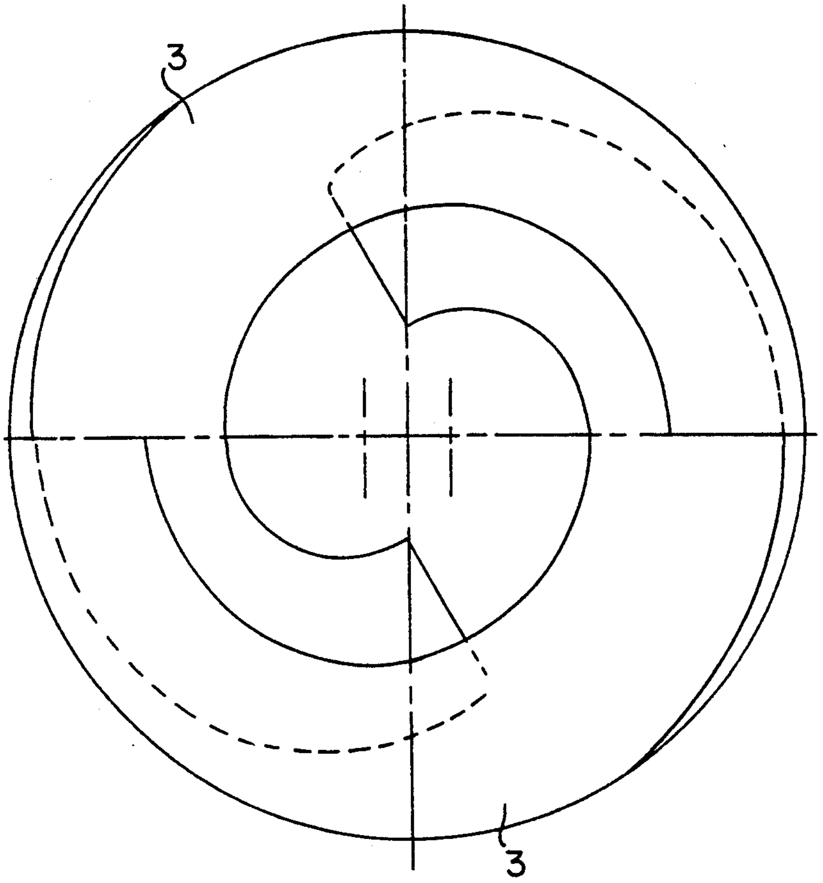
FIG. 8 shows the baffle means of FIG. 7 in a top view.

In the embodiment illustrated in FIGS. 7 and 8 (for the sake of clarity, only the lowermost end of the dip pipe 1 is shown), the two baffles 3 extend over 270° (in the embodiment of FIGS. 1-3, the baffles 3 extend over 180°), so that diffuser-type inlet channels result which become wider away from the inlet slots 12. Thereby, the recovery of pressure from the flow velocity of the medium is enhanced. On account of this feature, it is left up to the gases flowing into the dip pipe 1 to choose the direction in which they flow through the baffles 3 to the dip pipe.

A closure plate 30 with a rim 31 curving away from the dip pipe 1 is additionally provided at the lower end of the baffles 3 according to FIG. 7. This closure plate 30, which can also be provided in the other embodiments of the baffle means 2 according to this invention, prevents the zone where a vacuum is ambient outside of the dip pipe 1 from spreading into the dip pipe 1.

I claim:

1. A dip pipe (1) for an apparatus for separating mixtures made up of at least one liquid or gaseous medium and at least one liquid or gaseous substance having a higher specific gravity than the medium under action of centrifugal forces, said medium being separated at least partially from the substance being removed from the apparatus through the dip pipe (1), said dip pipe (1) having a longitudinal axis (5) and comprising:

an orifice (13) located at one end of the dip pipe (1); and baffle means (2) fixed at the same one end of the dip pipe (1), said baffle means (2) including at least one curved baffle (3) having linear rims (8, 9) that get closer to the longitudinal axis (5) of the dip pipe (1) as the linear rims (8, 9) approach the orifice (13), said at least one curved baffle (3) also having a free rim (6) from which a radius (r) of curvature of the at least one curved baffle (3) increases as the radius (r) is measured along the longitudinal axis (5) in a direction of flow of the medium through the orifice (13) away from the free rim (6) into the dip pipe (1).

2. Dip pipe (1) according to claim 1, wherein:

said at least one curved baffle (3) has one of a partially conical and a partially frustoconical shape; and said at least one curved baffle (3) also has an axis (4) of curvature which extends parallel to and is spaced at a distance (a) from the longitudinal axis (5) of the dip pipe (1).

3. Dip pipe (1) according to claim 2, wherein:

said linear rims (8, 9) lie in a vertical plane (10) that also includes the axis (4) of curvature and the longitudinal axis (5) of the dip pipe (1).

4. Dip pipe (1) according to claim 1, wherein:

said at least one curved baffle (3) has a truncated cone shell shape.

5. Dip pipe (1) according to claim 1, wherein:

said at least one curved baffle (3) has an edge (7) in a transitional zone.

6. Dip pipe (1) according to claim 1, wherein:

said at least one curved baffle (3) includes two or more identical baffles (3) each having an axis (4) of curvature parallel to one another and also parallel to the longitudinal axis (5) of the dip pipe (1).

7. Dip pipe (1) according to claim 6, wherein:

each of said two or more identical baffles (3) extends around the longitudinal axis (5) of the dip pipe (1) approximately by a fraction of about 360° corresponding to the number of identical baffles (3).

8. Dip pipe (1) according to claim 6, wherein:

said two or more identical baffles (3) are arranged symmetrically around the longitudinal axis (5) of the dip pipe (1).

9. Dip pipe (1) according to claim 1, wherein:

said at least one curved baffle (3) includes two identical baffles (3) each having an axis (4) of curvature located diametrically opposite to the other equidistant from and parallel to the longitudinal axis (5) of the dip pipe (1).

10. Dip pipe (1) according to claim 9, wherein:

one of said two identical baffles (3) has a portion located radially closer to the longitudinal axis (5) of the dip pipe (1), said portion extending within and overlapping a part of the other of said two identical baffles (3).

11. Dip pipe (1) according to claim 10, wherein:

said portion of the one of said two identical baffles (3) extends within and overlaps the part of the other of the two identical baffles (3) at least over an angle of 90°.

12. Dip pipe (1) according to claim 9, wherein:

each of said two identical baffles (3) extends over an angle of about 270° so that there is an overlap of about 180° between the two identical baffles (3).

13. Dip pipe (1) according to claim 1, wherein:

said linear rims (8, 9) define inlet slots (12) open in a direction (11) of rotation for the medium.

14. Dip pipe (1) according to claim 1, further comprising:

an edge means (14) for extending parallel to the longitudinal axis (5) at another end of the dip pipe (1).

15. Dip pipe (1) according to claim 1, further comprising:

a closure plate (3) having a rim (31) curving away from the one end of the dip pipe (1).

16. Dip pipe (1) according to claim 15, wherein:

said closure plate (30) extends substantially perpendicular to the longitudinal axis (5) of the dip pipe (1).

17. Dip pipe (1) according to claim 15, wherein:

said rim (31) of the closure plate (30) projects radially beyond the free rim (6) of said at least one curved baffle (3).

18. Dip pipe (1) according to claim 1, wherein:

said free rim (6) of said at least one curved baffle (3) has a spiral shape.

* * * * *

UNITED STATES PATENT AND TRADEMARK OFFICE

CERTIFICATE OF CORRECTION

PATENT NO. : 5,275,730

DATED : January 4, 1994

INVENTOR(S) : Josef KEUSCHNIGG

It is certified that error appears in the above-indentified patent and that said Letters Patent is hereby corrected as shown below:

Column 1, line 8, change "gaseous" (second occurrence) to --solid--.

Column 5, line 65 (Claim 1, line 3), change "gaseous" to solid--.

Signed and Sealed this

Twenty-second Day of February, 2000

Attest:

Q. TODD DICKINSON

Attesting Officer

Commissioner of Patents and Trademarks